United States Patent
Nelson et al.

(10) Patent No.: US 6,863,394 B1
(45) Date of Patent: Mar. 8, 2005

(54) ORNAMENTAL ATTACHMENT FOR A PAIR OF EYEGLASSES

(76) Inventors: Glendia Nelson, 9137 S. LaSalle Ave., Los Angeles, CA (US) 90047; Rosemary Baskom, 9137 S. LaSalle Ave., Los Angeles, CA (US) 90047

(*) Notice: Subject to any disclaimer, the term of this patent is extended or adjusted under 35 U.S.C. 154(b) by 0 days.

(21) Appl. No.: 10/867,292

(22) Filed: Jun. 14, 2004

(51) Int. Cl.$^7$ .................................. G02C 11/02
(52) U.S. Cl. ..................... 351/52; 351/153; 16/228
(58) Field of Search .................. 351/51, 52, 153, 351/158; 16/228

(56) References Cited

U.S. PATENT DOCUMENTS

| | | | |
|---|---|---|---|
| 4,968,128 A | 11/1990 | Mendola | 351/52 |
| 5,125,786 A | 6/1992 | Baker | 414/684.3 |
| 5,161,234 A | 11/1992 | Nitta | 351/52 |
| 5,185,620 A | 2/1993 | Cooper | 351/52 |
| 5,360,639 A | 11/1994 | Kawabata | 427/270 |
| 5,583,584 A | 12/1996 | Friedman | 351/52 |
| 5,912,718 A | 6/1999 | Murai | 351/52 |

FOREIGN PATENT DOCUMENTS

EP      0456381 A1 * 11/1991

* cited by examiner

*Primary Examiner*—Huy Mai
(74) *Attorney, Agent, or Firm*—Goldstein Law Offices, P.C.

(57) ABSTRACT

An ornamental attachment for selective attachment to an existing pair of eyeglasses having hinged junctions that utilize hinge screws that are selectively removable therefrom, for enhancing the visual appeal of the pair of eyeglasses. The ornamental attachment has a hinge screw portion, a curved portion extending from the hinge screw portion, and an attachment portion extending from the curved portion. The attachment portion has a decorative ornament extending laterally therefrom. The hinge screw portion is selectively inserted into the hinged junction of the eyeglasses after the hinge screw has been selectively removed therefrom, and a small clip is affixed to a free end of the hinge screw portion, in order to secure the ornamental attachment to the pair of eyeglasses.

7 Claims, 3 Drawing Sheets

ORNAMENTAL ATTACHMENT FOR A PAIR OF EYEGLASSES

BACKGROUND OF THE INVENTION

1. Field of the Invention

The invention generally relates to an accessory for an existing pair of eyeglasses, and in particular relates to an ornamental attachment that is removably mounted to an existing pair of eyeglasses in order to augment the visual appeal of the pair of eyeglasses.

2. Description of the Related Art

Eyeglasses, used for improving the vision of hundreds of millions of users worldwide, generally comprise two lenses, an eyeglass frame for supporting the lenses, and temple legs for selectively securing the eyeglasses to a head of a user. A great variety of differently designed eyeglasses have been devised, in order to suit the varied aesthetic preferences of different users. However, most existing eyeglasses suffer from a notable disadvantage. In particular, although a pair of eyeglasses may be perfectly suitable for a particular occasion, an individual may want to change or augment the appearance of the pair of eyeglasses on a different occasion. However, once the individual has purchased a pair of eyeglasses having a particular design, said individual is generally not fully at liberty to purchase an additional pair of eyeglasses having a different design, because eyeglasses are generally quite expensive. Accordingly, there is a need for an ornamental attachment that is removably mounted to an existing pair of eyeglasses in order that an individual may change or augment the appearance of the eyeglasses on different occasions, and which substantially obviates the need for purchasing a new pair of eyeglasses.

A variety of different eyeglasses, eyeglass frames, and ornamental accessories for eyeglasses have been devised. For example, U.S. Pat. No. 5,161,234 to Nitta appears to show a hanging ornament that is attached to an eyeglass frame by connecting loop-like hanging portions to temple pieces of eyeglasses by way of a link-type fastener in order that the ornament may be easily interchanged. Additionally, U.S. Pat. No. 4,968,128 to Mendola appears to show an eyeglass frame having a clasp having a clamp terminating in a U-shaped holder, and having an ornament having a rod at its periphery, said rod being held within said U-shaped holder when said rod is removably placed on said holder, and having locking means for securing the ornament to the clasp. Moreover, U.S. Pat. No. 5,583,584 to Friedman appears to show an apparatus for removably mounting an ornamental attachment to the temple piece of an eyeglass frame, wherein the ornamental attachment is secured to the temple piece with machine screws. Furthermore, U.S. Pat. No. 5,912,718 to Murai et al appears to show a pair of eyeglasses having a flexible lens holding member such as a nylon wire, wherein a decoration is fastened to the periphery of the lens in order to augment the appearance of the eyeglasses. What's more, U.S. Pat. No. 5,185,620 to Cooper appears to show an eyeglass system for mounting ornaments onto an eyeglass frame, wherein the ornaments are releasably secured to the eyeglass frame by a spring-biased projection mechanism mounted within the temple member of the eyeglasses.

While these devices may be suitable for the particular purpose employed, or for general use, they would not be as suitable for the purposes of the present invention as disclosed hereafter.

SUMMARY OF THE INVENTION

It is an object of the invention to provide an ornamental attachment that will augment the visual appeal of an existing pair of eyeglasses. Accordingly, the ornamental attachment is selectively attachable to the pair of eyeglasses, and has a decorative ornament that greatly enhances the visual appeal of the pair of eyeglasses.

It is another object of the invention to provide an ornamental attachment that is easily attachable to eyeglasses having hinged junctions that utilize hinge screws that are selectively removable therefrom. Accordingly, the ornamental attachment has a hinge screw portion which is selectively inserted into the hinged junction of the eyeglasses after the hinge screw has been selectively removed therefrom. The ornamental attachment is provided with a small clip which selectively attaches to a free end of the hinge screw portion, thereby providing an ornamental attachment that is easily attachable to a pair of eyeglasses.

It is yet another object of the invention to provide an ornamental attachment for an existing pair of eyeglasses that is not unduly expensive. Accordingly, the materials from which the ornamental attachment is constructed are readily available, and its cost is not prohibitive.

The invention is an ornamental attachment for selective attachment to an existing pair of eyeglasses having hinged junctions that utilize hinge screws that are selectively removable therefrom, for enhancing the visual appeal of the pair of eyeglasses. The ornamental attachment has a hinge screw portion, a curved portion extending from the hinge screw portion, and an attachment portion extending from the curved portion. The attachment portion has a decorative ornament extending laterally therefrom. The hinge screw portion is selectively inserted into the hinged junction of the eyeglasses after the hinge screw has been selectively removed therefrom, and a small clip is affixed to a free end of the hinge screw portion, in order to secure the ornamental attachment to the pair of eyeglasses.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 3:
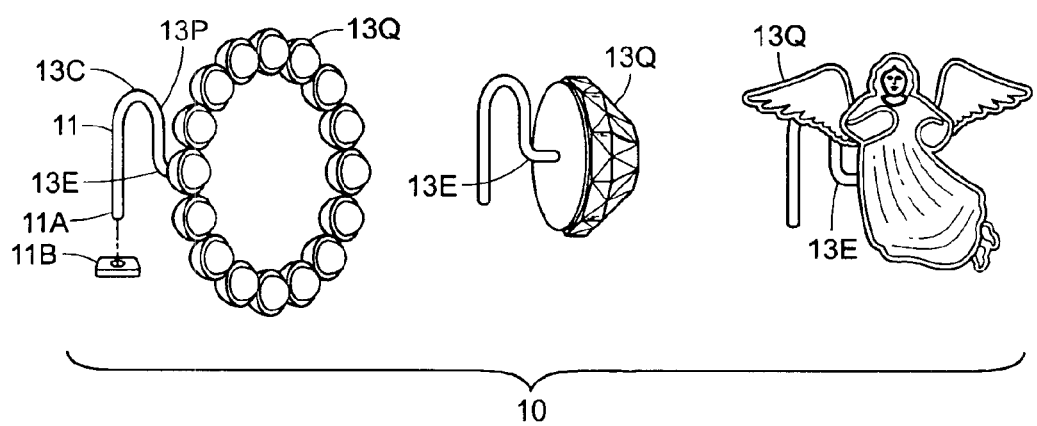
FIG. 3 is a perspective view of various ornamental attachments according to the present invention, prior to selective attachment to the pair of eyeglasses.

FIG. 3 illustrates different embodiments of an ornamental attachment 10 according to the present invention, prior to selective attachment to an existing pair of eyeglasses. The ornamental attachment 10 comprises a cylindrical hinge screw portion 11, a curved portion 13C extending from the hinge screw portion 11, and an attachment portion 13P extending from the curved portion 13C. The hinge screw portion 11 has a free end 11A. The ornamental attachment 10 is provided with a clip 11B, preferably a spring-loaded clip, for selective attachment to the free end 11A of the hinge screw portion 11 after the ornamental attachment 10 has been attached to the pair of eyeglasses, in order to prevent the ornamental attachment 10 from inadvertently falling off of the pair of eyeglasses. The attachment portion 13P is substantially parallel to the hinge screw portion 11, and extends downwardly from the curved portion 13C. The attachment portion 13P has an end 13E having an ornament 13Q extending laterally therefrom. The different embodiments of the ornamental attachment 10 differ primarily in the size, shape, and type of the ornament 13Q, as will be described. The ornament 13Q typically has the appearance of jewelry, but may be in the form of an angel or other figures.

Figure 1:
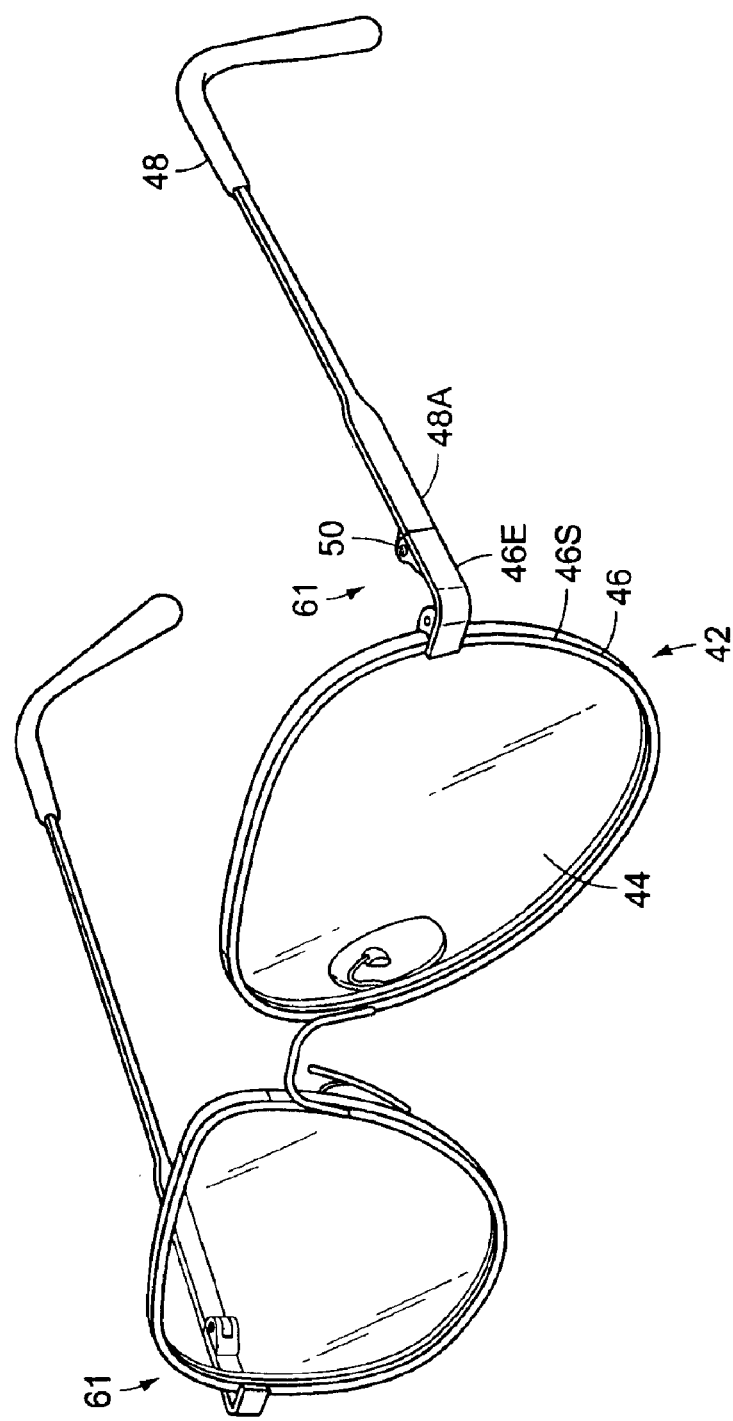
FIG. 1 is a perspective view of an existing pair of eyeglasses having an eyeglass frame having two temple legs extending therefrom.

FIG. 1 illustrates the existing pair of eyeglasses 42 prior to selective attachment thereunto of one or two of the ornamental attachments 10. The pair of eyeglasses 42 has two lenses 44, an eyeglass frame 46 for supporting the lenses 44, and two temple legs 48 for selectively attaching the eyeglasses 42 to the head of a user. The eyeglass frame 46 has two lateral sides 46S, each having an attachment endpiece 46E extending therefrom. The temple legs 48 each have a first end 48A that is hingeably attached to the attachment endpiece 46E at a hinged junction 61.

Figure 2:
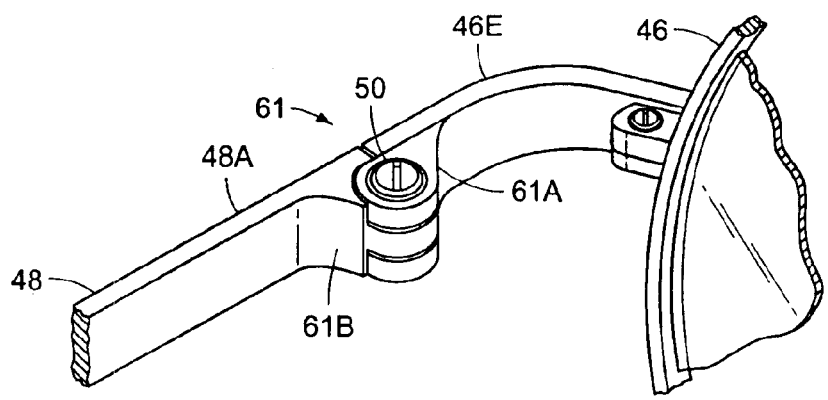
FIG. 2 is an enlarged perspective view of the hinged junction between one of the temple legs and the eyeglass frame.

FIG. 2 is an enlarged view of the hinged junction 61 between one of the temple legs 48 and one of the attachment endpieces 46E of the eyeglass frame 46. The hinged junction 61 comprises a first hinge member 61A rigidly affixed to the attachment endpiece 46E of the eyeglass frame 46, a second hinge member 61B rigidly affixed to the first end 48A of the temple leg 48, and a cylindrical threaded hinge screw 50 which hingeably attaches the first hinge member 61A to the second hinge member 61B, in order that the temple legs 48 may be swiveled substantially flush against the eyeglass frame 46, so that the eyeglasses 42 may be compactly stored between successive uses. The hinge screw 50 has a first end having a notch extending diametrically across, and a threaded second end. The hinge screw 50 is selectively removable from the junction 61 by a user by inserting a tip of an existing screwdriver into the notch and unthreading the hinge screw 50, in order to selectively detach the temple leg 48 from the attachment endpiece 46E of the eyeglass frame 46. The hinge screw 50 is unthreaded from the hinged junction 61, and interchanged with the hinge screw portion 11 of the ornamental attachment 10, when the ornamental attachment 10 is selectively attached to the pair of eyeglasses 42, as will be described.

Figure 4:
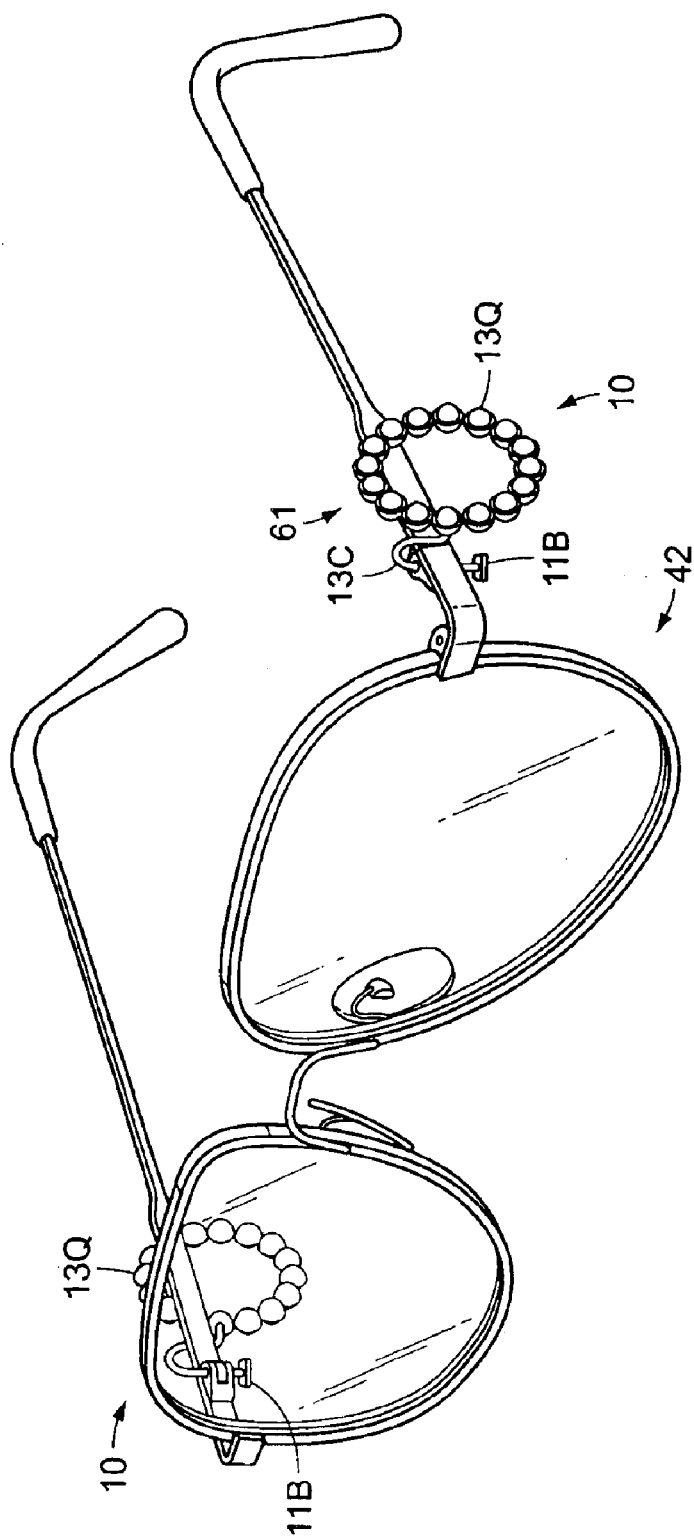
FIG. 4 is a perspective view of two of the ornamental attachments, after selective attachment to the pair of eyeglasses.

FIG. 4 illustrates two of the ornamental attachments 10, after their selective attachment to the pair of eyeglasses 42. The hinge screws 50 have been unthreaded from the hinged junctions 61, and the hinge screw portions 11 of the ornamental attachments 10 have been extended into the hinged junctions 61 in their place, in order to secure the ornamental attachment 10 to the eyeglasses 42. After selective attachment of an ornamental attachment 10 to the pair of eyeglasses 42, the hinge screw portion 11 of the ornamental attachment 10 hingeably attaches the first hinge member 61A to the second hinge member 61B of the junction 61, and thereby connects the temple leg 48 to the attachment endpiece 46E of the eyeglass frame 46. The ornamental attachment 10 is prevented from inadvertently falling off of the pair of eyeglasses 42 by "clipping" the clip 11B onto the free end 11A of the hinge screw portion 11 after the ornamental attachment 10 has been extended into the hinged junction 61.

The ornamental attachment 10 is well suited for use with a variety of different types of eyeglasses 42 having hinged junctions 61 which utilize hinge screws 50 which are selectively removable therefrom.

In an alternate "clip-on" embodiment, the ornamental attachment 10 comprises a spring-loaded clip having an ornament 13Q attached thereunto. The spring-loaded clip is used for selectively securing the ornamental attachment 10 to various portions of the eyeglass frame 46 or to portions of the temple legs 48. Such an embodiment may be easily attached to eyeglasses 42 that do not utilize hinge screws 50 that have been extended within hinged junctions 61.

The ornamental attachment 10 is provided in a variety of different sizes, in order to match the varied aesthetic preferences of different users. In particular, the size of the ornaments 13Q of the ornamental attachments 10 ranges from approximately several millimeters to approximately eight centimeters. The larger ornaments 13Q present a more ostentatious and flamboyant appearance. The user may selectively secure an ornamental attachment 10 to one or both of the hinged junctions 61 of the eyeglasses 42, depending on the aesthetic preferences of the user. The ornament 13Q of the ornamental attachment 10 is typically in the form of jewelry, preferably costume jewelry, in order to minimize the cost of the ornamental attachment 10, and also to minimize monetary loss in the event that one of the ornamental attachments 10 is inadvertently lost by the user. A variety of stones, and artificial diamonds, jade, rubies, and emeralds may be used within the ornament 13Q.

In use, an ornamental attachment 10 is selectively secured to a pair of eyeglasses 42 by unthreading one of the hinge screws 50 from a hinged junction 61, and by extending the hinge screw portion 11 of the ornamental attachment 10 into the hinged junction 61, in place of the hinge screw 50, in order to secure the ornamental attachment 10 to the eyeglasses 42, and to connect the temple leg 48 to the attachment endpiece 46E of the eyeglass frame 46. The ornamental attachment 10 is prevented from inadvertently falling off of the pair of eyeglasses 42 by "clipping" the clip 11B onto the free end 11A of the hinge screw portion 11 after the ornamental attachment 10 has been extended into the hinged junction 61. The user may selectively secure a second ornamental attachment 10 to the second hinged junction 61 of the eyeglasses 42 by an identical process, if the user so desires.

In conclusion, herein is presented an ornamental attachment for an existing pair of eyeglasses, which is removably mounted to the pair of eyeglasses in order to enhance their visual appeal. The invention is illustrated by example in the drawing figures, and throughout the written description. It should be understood that numerous variations are possible, while adhering to the inventive concept. Such variations are contemplated as being a part of the present invention.

What is claimed is:

1. A ornamental attachment, for use by a user having a head and having an existing pair of eyeglasses, for selective attachment to the pair of eyeglasses in order to augment their visual appeal, said pair of eyeglasses having two lenses, an eyeglass frame for supporting the lenses, and two temple legs for selectively attaching the eyeglasses to the head of the user, said eyeglass frame having two lateral sides, each having an attachment endpiece extending therefrom, said temple legs each having a first end that is hingeably attached to the attachment endpiece at a hinged junction by a hinge screw which is selectively removable from the hinged junction, said ornamental attachment comprising:

a hinge screw portion for selective extension into the hinged junction after the hinge screw has been selectively removed therefrom, in order to secure the ornamental attachment to the pair of eyeglasses, said hinge screw portion having a free end;

a clip which is selectively clipped-onto the free end of the hinge screw portion after the hinge screw portion has been extended into the hinged junction, for selectively preventing the ornamental attachment from inadvertently falling off of the pair of eyeglasses;

a curved portion extending from the hinge screw portion;

an attachment portion extending from the curved portion, said attachment portion having an end;

an ornament extending laterally from the end of the attachment portion; and wherein the user may selectively secure an ornamental attachment to each of the two hinged junctions of the eyeglasses, depending on the aesthetic preferences of the user.

2. The ornamental attachment as recited in claim 1, wherein the attachment portion is substantially parallel to the hinge screw portion, and extends downwardly from the curved portion.

3. The ornamental attachment as recited in claim 2, wherein the hinge screw portion is substantially cylindrical.

4. The ornamental attachment as recited in claim 3, wherein the ornament is in the form of jewelry, in order to greatly enhance the appearance of the pair of eyeglasses onto which it has been selectively attached.

5. The ornamental attachment as recited in claim 4, wherein the ornament is in the form of costume jewelry, in order to minimize the cost of the ornamental attachment.

6. A method of augmenting and improving the appearance of an existing pair of eyeglasses having a frame having two attachment endpieces extending therefrom, two temple legs, and two hinged junctions, each hinged junction having an associated hinge screw removably inserted therein, said hinged junction for hingeably attaching the temple legs to the attachment endpieces, said method utilizing at least one ornamental attachment having a hinge screw portion having a free end, a curved portion extending from the hinge screw portion, and an attachment portion extending from the curved portion, said attachment portion having an end having an ornament extending laterally therefrom, said ornamental attachment having a clip for selective attachment onto the free end of the hinge screw portion, said method comprising the steps of:

removing a hinge screw from one of the hinged junctions; and attaching a first ornamental attachment to the pair of eyeglasses, and simultaneously connecting the temple leg to the attachment endpiece of the frame, by extending the hinge screw portion of the ornamental attachment into said hinged junction in place of the hinge screw that has been removed therefrom, and then by securing the clip onto the free end of the hinge screw portion, in order to prevent the ornamental attachment from inadvertently falling off of the pair of eyeglasses.

7. The method of augmenting and improving the appearance of an existing pair of eyeglasses as recited in claim 6, said method utilizing two ornamental attachments, wherein the step of attaching a first ornamental attachment to the pair of eyeglasses is followed by the step of attaching a second ornamental attachment to the other hinged junction of the pair of eyeglasses by a process that is identical to that used for securing the first ornamental attachment to the first hinged junction.

\* \* \* \* \*